United States Patent
Freser-Wolzenburg

(10) Patent No.: US 8,142,696 B2
(45) Date of Patent: Mar. 27, 2012

(54) METHOD AND DEVICE FOR THE PRODUCTION OF BACK-FOAMED AIR-PERMEABLE TEXTILE PRODUCTS

(75) Inventor: Thomas Freser-Wolzenburg, Garbsen (DE)

(73) Assignee: Stankiewicz GmbH, Adelheidorf (DE)

( * ) Notice: Subject to any disclaimer, the term of this patent is extended or adjusted under 35 U.S.C. 154(b) by 1234 days.

(21) Appl. No.: 11/629,634

(22) PCT Filed: Jun. 14, 2005

(86) PCT No.: PCT/EP2005/006360
§ 371 (c)(1),
(2), (4) Date: Aug. 7, 2007

(87) PCT Pub. No.: WO2005/123360
PCT Pub. Date: Dec. 29, 2005

(65) Prior Publication Data
US 2008/0044641 A1     Feb. 21, 2008

(30) Foreign Application Priority Data
Jun. 15, 2004   (DE) .......................... 10 2004 028 803

(51) Int. Cl.
*B32B 37/00* (2006.01)
(52) U.S. Cl. ........................................ 264/45.6; 428/96
(58) Field of Classification Search ................. 264/45.6; 428/96, 95, 304.4
See application file for complete search history.

(56) References Cited

U.S. PATENT DOCUMENTS

| | | | |
|---|---|---|---|
| 4,976,414 A | 12/1990 | Yanagishita | |
| 5,294,386 A | 3/1994 | Roth et al. | |
| 5,334,338 A | 8/1994 | Kittel et al. | |
| 6,361,723 B1 | 3/2002 | Sulzbach et al. | |
| 2006/0113694 A1 | 6/2006 | Freser-Wolzenburg | |

FOREIGN PATENT DOCUMENTS

| | | |
|---|---|---|
| DE | 1504278 | 10/1965 |
| DE | 3020793 | 12/1981 |
| DE | 3809980 A1 | 10/1989 |
| DE | 691 13 137 T2 | 3/1996 |
| DE | 197 01 728 A1 | 7/1998 |
| DE | 199 34 590 A1 | 1/2001 |
| DE | 102 58 546 A1 | 7/2004 |
| EP | 0 023 749 | 2/1981 |
| EP | 0 044 226 | 1/1982 |

(Continued)

OTHER PUBLICATIONS

International Search Report for PCT/EP2005/006360; mailed Sep. 9, 2005.

(Continued)

*Primary Examiner* — Lynda Salvatore
(74) *Attorney, Agent, or Firm* — Grossman, Tucker, Perreault & Pfleger, PLLC

(57) ABSTRACT

A method for producing back-foamed air-permeable textile products, whereas, instead of providing a film or the like to prevent the penetration of reaction products or foam to the visible face, the pressure created during the reaction is intentionally decreased so that none of the reaction products nor the foam created by the reaction of the reaction products is able to penetrate the textile product. With a product manufactured in this way, the climatic comfort is improved and a better acoustic effect can be achieved. The disclosure also relates to a device which is suitable for carrying out the method and to a corresponding back-foamed air-permeable textile product.

12 Claims, 4 Drawing Sheets

FOREIGN PATENT DOCUMENTS

| | | |
|---|---|---|
| FR | 2 634 157 A | 1/1990 |
| GB | 1 411 883 | 10/1975 |
| JP | 04-312811 | 11/1992 |

OTHER PUBLICATIONS

International Preliminary Report on Patentability for PCT/EP2005/006360; issued Dec. 28, 2006.

METHOD AND DEVICE FOR THE PRODUCTION OF BACK-FOAMED AIR-PERMEABLE TEXTILE PRODUCTS

BACKGROUND OF THE INVENTION

1. Field of the Invention

The invention relates to a method and a device for producing back-foamed air-permeable textile products such as back-foamed mats as a floor covering for motor vehicles, seat upholstery, head rests and the like, and to a back-foamed air-permeable textile product of this type.

2. Related Technology

The above-mentioned products are typical representatives of such air-permeable textile products which can be back-foamed on the back turned away from a useful or visible face.

In the case of floor coverings for a motor vehicle, the back-foamed mat has the function not only of compensating for unevenness in a vehicle floor relative to the desired planar configuration in the vehicle interior but also of receiving cables and of insulating and damping undesirable noises. The mat is an air-permeable textile product, generally a carpet web, which is tufted in a textile air-permeable carpet substrate.

In the case of seat upholstery, head rests and the like, back-foaming of the textile product, generally a fabric, in turn has the function of giving the seat upholstery or the head rest a desired form which improves the sitting posture. Acoustic effects here are relatively insignificant, it being more important additionally to achieve very good climatic comfort. Climatic comfort refers to the property whereby air can circulate through the textile product, even when it is back-foamed, so that atmospheric moisture can be transported and air can also circulate easily, leading to rapid compensation in terms of ambient temperature and ambient humidity, in particular also when a person is using the seat upholstery or the head rest.

Conventionally the air-permeable textile product, for example a mat blank, etc., is inserted into a mould with the useful or visible face resting on one mould half for typical manufacture. The mold is then closed and the reaction product is introduced to form the back-foaming foam such as polyurethane foam. A relatively high pressure is produced during the reaction of the reaction products. Since the textile product is air-permeable, usually being a hosiery or knitted fabric or the like with high porosity, and due to the action of capillary forces, at least one of the reaction products, possibly all of them, can pass through these pores or openings in the fabric to the visible face of the textile product, where they adhere to any parts provided there. Any foam which is being formed can also pass through these pores. This is highly undesirable. Back-foamed textile products in which the visible face has adhesive regions or in which the foam has passed to the visible face cannot be sold.

To overcome this problem, a film is provided on the back of the mat as an acoustically effective component (DE 38 09 980 C2) with a known method for manufacturing floor coverings. Closed-cell thin foam layers have also been proposed. The known provision of a film is counter-productive to the achievement of climatic comfort as it prevents the circulation of air. A film of this type, which is impermeable to air, is also undesirable with respect to the acoustic properties.

It is known from DE 691 13 137 T2 to destroy such a film, at least in part, after manufacture of the back-foamed product by additional methods, the effect of heat combined with the production of a reduced pressure. The additional process steps required here are obviously very expensive and complex, and the complete or uniform removal or perforation of the film cannot be reproducibly ensured. Residues of the film adversely affect the flow resistance at the respective positions. Therefore, this procedure is not particularly suitable, especially for mass production.

SUMMARY OF THE INVENTION

Accordingly, the invention to provides a method and a device for the production of back-foamed air-permeable textile products, with which the penetration of reaction products or foam to the visible face can be reliably avoided, without necessitating the provision of films or the like.

The invention provides a method for producing back-foamed air-permeable textile products, including the steps of inserting the textile product into a mold, closing the mold and introducing reactants to form the foam, allowing reactants to react, with a simultaneous decrease in the pressure created during the reaction via at least one expansion orifice in the mold half turned away from the inserted textile product, and controlling the decrease in pressure in such a way that none of the reactants nor the foam created by the reaction penetrates the textile product.

The invention also provides a back-foamed air-permeable textile product such as a back-foamed mat as a floor covering for a motor vehicle, seat upholstery, head rest or the like, in which the cells of the foam adhere tightly to the back of the textile product without the interposition of a film or the like and without the foam penetrating the textile product.

The invention also provides a device for carrying out the inventive method, including a mold and with an upper region, a suction orifice for evacuation and a system for ventilating the mold, and at least one expansion orifice at a predetermined position in an upper portion of the upper mold region, wherein the expansion orifice is associated with a control valve which can be activated in such a way that, as a function of product parameters and detected actual values, a decrease in the pressure produced during the reaction of the reactants takes place in the mold in such a way that none of the reactants themselves nor the foam produced by the reaction thereof can penetrate an air-permeable textile product inserted into the mold.

The pressure created inside the mold during the reaction of the reaction products and also the capillary action inherent in the textile product or its make-up are important parameters. Both parameters can be sufficiently determined via the time characteristic thereof, beginning with the introduction of the reaction products, to determine the time characteristic of the penetration-preventing decrease in pressure in the mould. A valve associated with at least one expansion orifice and opening toward the reduced pressure chamber is regulated accordingly. Toward the end of the back-foaming process, there is a smooth transition to the method according to the earlier application, in such a way that the backs of the back-foamed products are at least substantially void-free. The device according to the earlier application can basically also be employed since the four-way valve described therein is an arrangement in which a valve with a controllable degree of opening can be opened in a controlled manner to a reduced pressure source such as a reduced pressure chamber. The needle valve mentioned in the earlier application, which prevents the admission of foam into the expansion orifice and therefore the production of voids, can be retained without change.

BRIEF DESCRIPTION OF THE DRAWINGS

The invention will be described in more detail by the embodiment shown in the drawings, in which.

DETAILED DESCRIPTION

Figure 1:
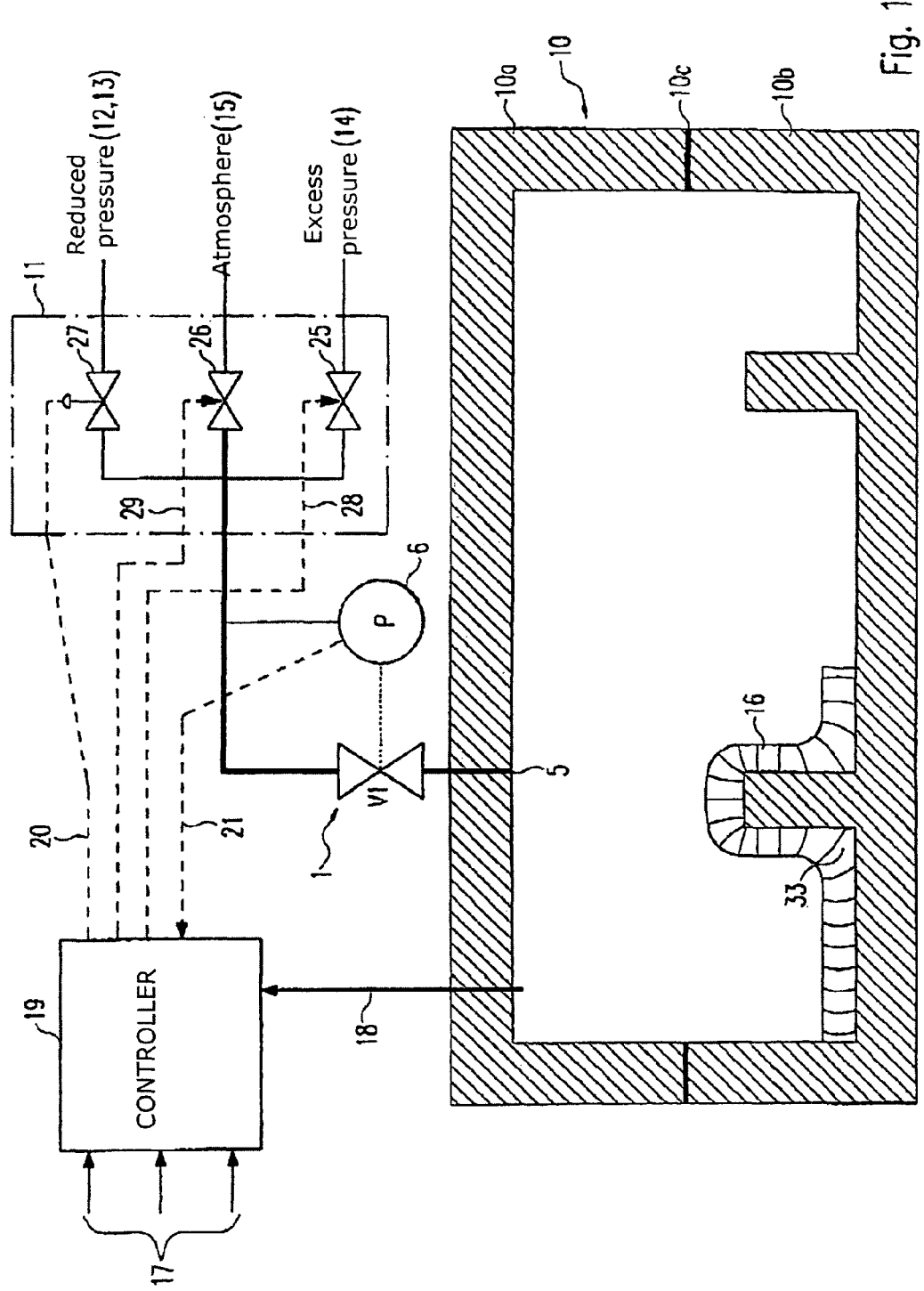
FIG. 1 is a schematic view and longitudinal section of a device for controlling the sequence in a mould according to an embodiment of the invention.

FIG. 1 shows a preferred embodiment of a device for carrying out the method according to the invention. A mold 10 with an upper mold half 10a and a lower mold half 10b can be seen. The two mold halves 10a, 10b are separated from one another by a mold parting plane 10c. The mold plane 10c preferably has a vacuum seal. In the case of elastically deformed textile products, the sealing effect can also be achieved by the textile product which is to be back-foamed itself. An expansion orifice 5 formed in the upper mold half 10a and having a needle valve 1 arranged therein is also provided. The needle valve 1 is connected via a valve arrangement designated schematically as a four-way valve 11 to a source of reduced pressure and excess pressure (not shown in detail) and to the atmosphere. This arrangement allows not only the extraction via the needle valve 1 of gases released during the expansion process but also the evacuation or ventilation of the mould 10 and the application of excess pressure. The output signal of a pressure sensor 6 serves to control the valve drive 7 of the needle valve 1 and preferably to regulate in accordance with the invention the internal pressure in the mould 10 during the expansion process, as will be explained hereinafter. If a drop in pressure is triggered by polyurethane which is penetrating the needle valve 1, the valve needle 3 is driven out downwards and the valve 1 closed, any polyurethane which has already penetrated being expelled again.

Figure 2:
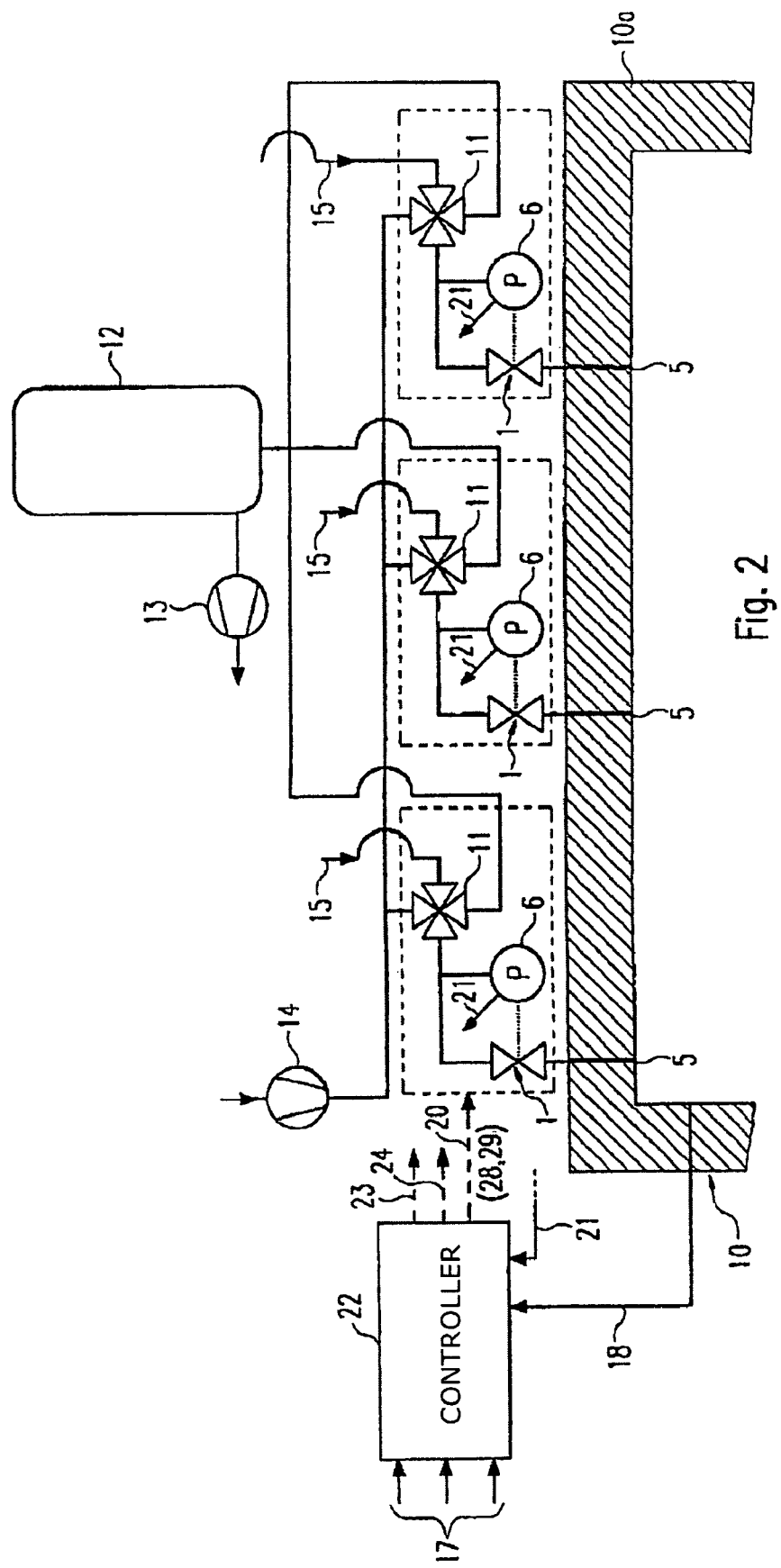
FIG. 2 is a schematic view and longitudinal section of a device equipped with a plurality of expansion orifices and a common reduced pressure and excess pressure supply according to a further embodiment of the invention.

FIG. 2 is a schematic view of the connection of a plurality of valves 1 of this type to a common media supply. The arrangement of a plurality of valves may be appropriate or even necessary in the case of moulds covering a very great area, to compensate the pressure loss over long flow paths by means of reduced pressure adjustment at the individual valves 1. Moulds with a complex geometric configuration, in particular with a plurality of peaks, are a further possible application, void formation being avoided herein. Other possible applications are conceivable.

According to FIG. 2, a plurality of needle valves 1 with respective pressure sensors 6 are arranged in the upper mould half 10a of the mould 10. The needle valves 1 are each connected via a four-way valve 11 to common supply lines to a reduced pressure source or to an excess pressure source 14. The reduced pressure source in this case consists of a vacuum tank 12 which may be evacuated by means of a vacuum pump 13. In addition, each four-way valve 11 also comprises an outlet 15 to the atmosphere. The four-way valve 11 is advantageously formed by an arrangement (cf. FIG. 1) of a two-position valve 25 to the excess pressure source 14, a two-position valve 26 to the atmosphere 15 and a control valve 27 to the reduced pressure source 12, 13. The control valve 27 is preferably a proportional valve which also allows individual adjustment of the reduced pressure to each single valve 1 or each expansion orifice 5, despite having a common media supply.

Figure 3:
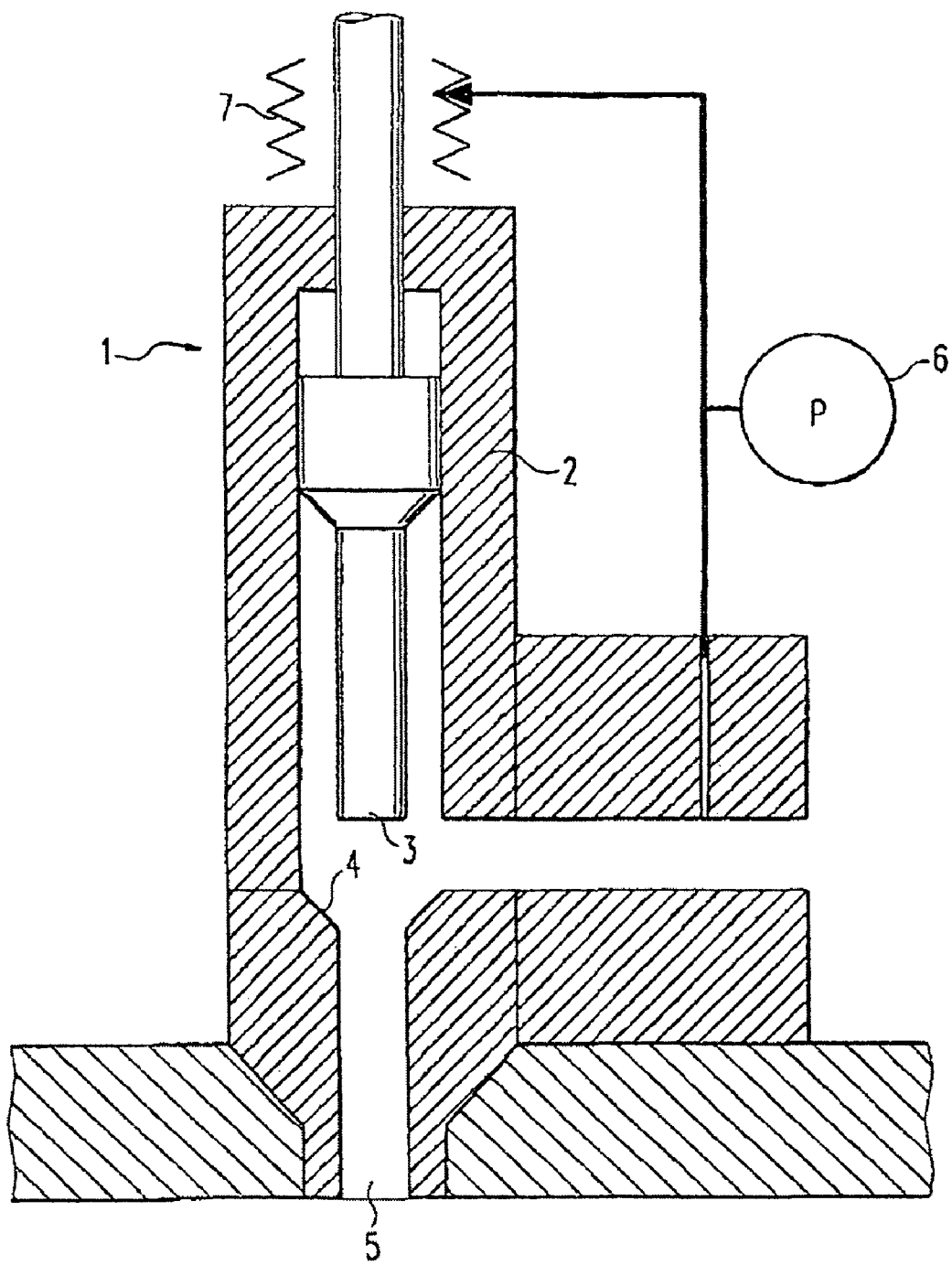
FIG. 3 is a schematic section of a needle valve which can be activated via a pressure sensor for use in the invention.

FIG. 3 is a schematic view of a needle valve 1. The needle valve 1 essentially comprises a housing 2, a valve needle 3 and a valve seat 4 as well as a capillary as the expansion orifice 5 of the mould. A pressure sensor 6 is also directly allocated. As soon as a foam front penetrates into the valve capillary or the expansion orifice 5, the pressure in the capillary drops abruptly. This pressure drop is detected by the pressure sensor 6 and converted via a control unit not shown in the figures into a control signal for a valve drive 7. This control signal causes the valve needle 3 (in the figure) to travel downwards and close the valve 1. The polyurethane which has already penetrated into the capillary 5 is thus expelled by the valve needle 3. The end face of this valve needle 3 is expediently constructed in such a way that it scrapes off this polyurethane completely and, when driven out, closes the expansion orifice 5 flush with the mould.

It is known per se to produce foamed polyurethane molded articles by introducing an expandable polyurethane reactive mix into a mold which is divided by a mold parting plane and evacuating the mold via a peripheral vacuum duct in the mold parting plane. There have already been a number or proposals for this purpose; see, for example, DE-OS 15 04 278, DE 30 20 793 A1, EP 0 023 749 A1 and DE 197 01 728 C2. The evacuation of the mold is required, in particular, to remove the gas inside the mold from the mold in order to avoid the formation of voids. To achieve this, it is necessary to configure the mold halves in such a way that the mold parting plane is located in the highest point of the mold cavity, to prevent the formation of a nest from which any gas present cannot be removed. This could be counteracted by evacuating the mould nest to a very low pressure of less than 100 mbar, in particular less than 50 mbar, before the foam rises, i.e. before the height of the foam in the mold nest exceeds that of the mold parting plane. However, such a low pressure in the mold nest means that the foam initially expands quickly and markedly before still substantial blowing agent contents are released, resulting in an irregular foam structure.

The properties of polyurethane foam are determined substantially by the density of the final foam and the material properties of the matrix. In particular if water is used as a chemical blowing agent, with carbon dioxide being released when the water reacts with the isocyanate, precise adaptation of the formulation of the expandable polyurethane reactive mix is required for adjusting the properties of the matrix. It is basically desirable to be able to produce foams with different bulk densities from a single formulation. In order to control the density of a foam without changing the formulation, in particular the blowing agent content, it is extremely expedient to control the pressure in the foaming mould, see for example EP 0 023 749 A1, EP 0 044 226 A1 and DE 197 01 728 C2.

The ability to regulate the process using the valves 1 and 27 is fundamental to the invention. While it is not intended and not possible to intervene in the expansion process with known methods, the pressure can be adjusted not only as a function of the reaction mix formulation owing to the possibility of intentionally activating the valves 27 selectively with the method according to the invention. According to the invention, the extraction pressure is regulated during the expansion process, allowing the adjustment of different extraction capacities when employing a plurality of valves for expansion control in moulds of great area (cf. FIG. 2).

The production of polyurethane foam, but also other foams, is known per se. The method according to the invention is universally applicable. The reactive mix can therefore be introduced into both the open and the closed mould, the foaming process being able to be triggered by addition of carbon dioxide or another blowing gas such as, for example, air, nitrogen, etc., and also with conventional blowing agents such as, for example, water or a combination of blowing agents, without restricting the generality. Depending on the variation of the method, the mould can then be evacuated to a reduced pressure of at least 300 mbar via the reduced pressure control valves 27.

Once the reaction mix has foamed and set, the mould is finally ventilated and opened with control in a manner known per se and the moulded part is ejected, optionally with the assistance of compressed air, via the valve 25.

In addition, not only the extraction of the gases released during the expansion process, but also the evacuation of the mould can similarly be carried out via these valves 1 and 27. The need for an additional extraction orifice and also evacuation via the mould parting plane are thus avoided. As the expansion orifice is preferably sealed not by the curing of a foam plug in the extraction duct—which results in the largest possible diameter of the duct or the capillaries since the polyurethane would otherwise penetrate too far into the reduced pressure system before it cures—but simply by the closure of the needle valve 1, the geometric dimensions of the capillary can be adapted directly to this additional function.

Capillary diameters of between 0.2 mm and 2 mm are preferred. If a capillary diameter of less than 0.2 mm is selected, the volumetric flow of reaction gases which can be carried off through the capillaries decreases markedly as the pressure loss is inversely proportional to the capillary diameter. As a result, either the cycle time increases or a greater number of valves is required. If, on the other hand, a capillary diameter of greater than 2 mm is selected, the detection of the change, which is crucial for the closure of the valve 1, in the flow through the capillary during penetration of the foam is complicated on account of the slight pressure loss. Compensation by lengthening the capillary (the Hagen-Poiseuille pressure loss is proportional to l/d (=length to diameter of the capillary)) has a considerable influence on the overall size which should be kept small in order to fit on or in the mould. As stated in the aforementioned earlier application, a chemical and/or physical variable, which changes rapidly as the foam front enters the valve capillary, is ascertained for controlling the needle valve 1, and the needle valve 1 is controlled as a function of the time characteristic of this variable. This method of activation has the advantage that the valve immediately closes independently when the foam front penetrates the capillary.

The pressure characteristic in the valve capillary over time is preferably ascertained as the control variable, the controller being designed in such a way that the valve 1 closes immediately owing to the pressure drop in the capillary that occurs during penetration of the foam front into the valve capillary. According to Hagen-Poiseuille's law, the pressure loss in the capillary is dependent on the viscosity of the medium passing through. As the foam front penetrates, the pressure loss increases by a factor of about $10^5$-$10^6$ owing to the different viscosity of polyurethane and air. For pressure detection, a pressure sensor can be provided in the capillary, as mentioned, the output signal of which is fed to a control unit and is converted by the control unit into a control signal for the movement of the valve needle 3. Piezo pressure sensors which are known per se, for example, can be used as pressure sensors.

A further variable for controlling the valve 1 in the foregoing sense can, for example, also be the throughput through the valve capillary which, for the reasons described above, decreases by a comparable factor as the foam front penetrates the capillary. However, the method according to the invention is not restricted to these particularly suitable control variables which are mentioned by way of example. The air flow in the capillary or in the draw line to the valve 27, the $CO_2$ content in the flowing gas or another variable which changes detectably over the course of the reaction can thus be used.

Preferably the valves 1, 11 are additionally used to ventilate the mould 10 and/or to apply compressed air to the mould 10 to assist removal. The number of components is thus also reduced, and this is accompanied by reductions in costs. However, these effects can also be achieved in other ways.

It is fundamental to the present method according to the invention that the control valve 27 is intentionally connected to reduced pressure in such a way that neither (still liquid) introduced reaction products nor foam which is created during the reaction is able to pass through the air-permeable textile product, for example a carpet web 16 indicated schematically in FIG. 1.

The typical reaction properties of the reaction product over time are basically known or can be determined in advance as parameters 17. Particular actual values 18 of the procedures in the mould 10, for example the beginning of injection of the reaction products, can be recorded as a physical variable. The pressure at the expansion orifice 5 detected by the pressure sensor 6 is shown separately as a particular actual value 21. This actual value 21 represents the value which changes detectably over the course of the reaction. These parameters 17 and the actual values 18 and 21 are fed to a controller 19, which determines a control signal 20 as a function thereof and delivers it to the control valve 27 and therefore connects the control valve 27 intentionally to reduced pressure as a function of the parameters 17 and the actual values 18, 21. The controller 19 determines additional adjustment signals 28 and 29 for the two-position valves 25 and 26 on the basis of the parameters 17 and the actual signals 18.

In the variation according to FIG. 2, a plurality of four-way valves 11 are connected to common sources of excess pressure 14 and reduced pressure 12, 13 and have respective orifices to the atmosphere 15. The associated controller 22, which also receives parameters 17 and actual values 18 and 21, operates substantially similarly to the arrangements in FIG. 1. However, it may be necessary, depending on the position of the respective expansion orifices, to produce the corresponding signals 20 and 23, 24 differently so that the respective control valves 27 of the four-way valves 11 each contribute intentionally to the desired effect.

Figure 4:
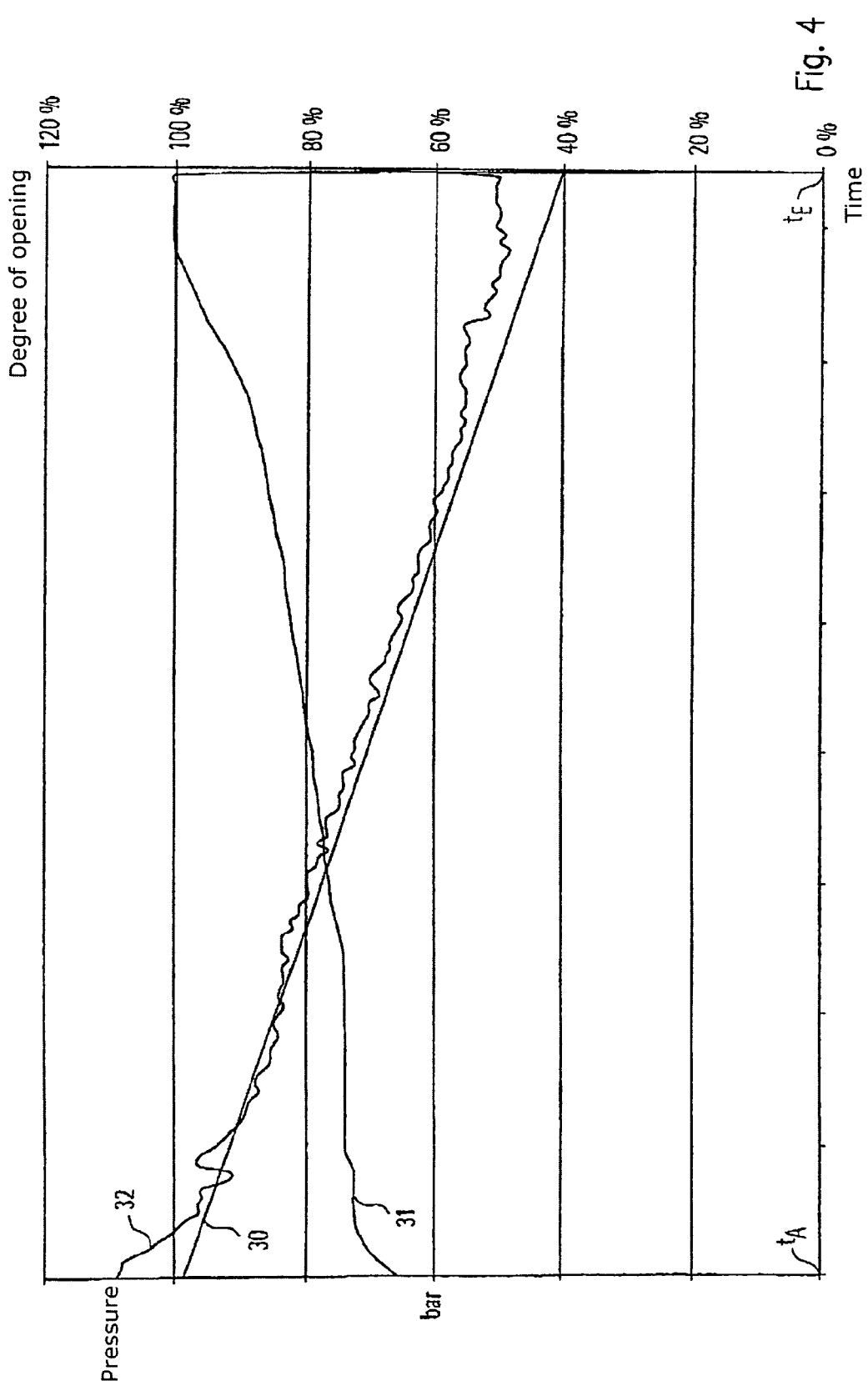
FIG. 4 shows the typical characteristic of pressure and degree of opening of the valve over time.

FIG. 4 shows the typical dependency of the degree of opening of a control valve 27 on the progress of the reaction in the mould over time t, symbolised by a typical desired characteristic of the pressure detected by a pressure sensor 6. Curve 30 shows the desired falling characteristic of the pressure in the mould 10 or at the pressure sensor 6 from the beginning of the reaction (time $t_A$) to the end of the reaction (time $t_E$) and curve 31, as a function thereof, the degree of opening of the control valve 27 achieved by means of the control signal. The curve 32 shows the actual pressure characteristic based on a regulation according to the invention. The foaming time ($t_E$-$t_A$) is typically 20 to 60 s. At the end, time $t_E$, the needle valve 1 closes, as mentioned, and the pressure (curve 32) temporarily increases markedly. A production cycle is then terminated by activating the valves 25 and 26 and opening the mould 10. Typical values for the pressure at the beginning ($t_A$) are of the order of 1000 mbar and at the end ($t_E$) 700 mbar, a pressure change over time of the order of about 1 to 20 mbar/s being desirable.

According to a particular development, the characteristic of the signals 20 (or 23, 24) controlling the control valves 27 can additionally be intentionally controlled in such a way that, at a suitable instant, air in the region 33 (FIG. 1) between the textile product, namely carpet web 16, and the interior of the facing mould half 10*b*, namely the lower mould half in this case, is extracted through the textile product in such a way that any cells which have already formed in the foam located therein are additionally opened. As the air stream is only slight, this will also take place only to a very limited extent, but an additional contribution will be made to the desired climate control and the desired acoustic effectiveness.

A back-foamed air-permeable textile product manufactured in this way has high climatic comfort and high acoustic effectiveness while being easy to manufacture.

What is claimed is:

1. Method for producing back-foamed air-permeable textile products comprising the steps of:
   inserting the textile product into a mold;
   closing the mold and introducing reactants to form the foam;
   allowing the reactants to react to create a foam, with a simultaneous decrease in pressure created during the reaction via at least one expansion orifice in the mold half turned away from the inserted textile product;
   controlling the decrease in pressure in such a way that none of the reactants nor the foam created by the reaction penetrates the textile product; and
   regulating the degree of opening of a valve associated with the expansion orifice toward a reduced pressure source.

2. Method according to claim 1, comprising regulating the degree of opening of the valve associated with the expansion orifice as a function of the progress of the reaction in the mold.

3. Method according to claim 2, comprising detecting a pressure characteristic at the expansion orifice and regulating the degree of opening as a function thereof and feedback of product-typical parameters.

4. Device for carrying out the method according to claim 1 comprising:
   a mold with an upper mold region;
   a suction orifice for evacuation;
   a system for ventilating the mold; and
   at least one expansion orifice at a predetermined position in an upper portion of the upper mold region, which the expansion orifice is associated with a control valve which can be activated in such a way that, as a function of product parameters and detected actual values, a decrease in the pressure produced during the reaction of the reactants takes place in the mold in such a way that none of the reactants themselves nor the foam produced by the reaction thereof can penetrate an air-permeable textile product inserted into the mold.

5. Device according to claim 4, which the control valve produces a regulatable connection to a reduced pressure source.

6. Device according to claim 5, comprising a plurality of expansion orifices provided at targeted positions of the mold, each of which is associated with a control valve, each control valve being able to be supplied with reduced pressure from a common media supply and each of the control valves being individually activatable.

7. Device according to claim 4, which the expansion orifice is configured as a capillary containing a needle valve which closes the expansion orifice when the foam reaches the expansion orifice.

8. Device according to claim 4, comprising a pressure sensor to detect the pressure at the expansion orifice, the pressure characteristic being used as a detectable actual value for regulating the decrease in pressure and optionally also for closing the needle valve.

9. Method according to claim 1, wherein the textile product is a back-foamed mat.

10. Method according to claim 9, wherein the textile product is selected from the group consisting of floor coverings for motor vehicles, seat upholstery, and head rests.

11. Method according to claim 3, wherein the product-typical parameter is capillary forces of the components of the textile product.

12. Method for producing back-foamed air-permeable textile products comprising the steps of:
    inserting the textile product into a mold;
    closing the mold and introducing reactants to form the foam;
    allowing the reactants to react to create a foam, with a simultaneous decrease in pressure created during the reaction via at least one expansion orifice in the mold half turned away from the inserted textile product;
    controlling the decrease in pressure in such a way that none of the reactants nor the foam created by the reaction penetrates the textile product; and
    once foaming has started on the back of the textile product inserted into the mold, regulating the decrease in pressure in such a way that any air present in the region of a useful or visible face of the textile product in the mold is extracted through the textile product and, in the process, opens cells in the foam already formed therein.

* * * * *